United States Patent [19]

Goncalves

[11] Patent Number: 5,261,571
[45] Date of Patent: Nov. 16, 1993

[54] DOSING DISPENSER

[75] Inventor: Antonin Goncalves, Montmorency, France

[73] Assignee: L'Oreal, Paris, France

[21] Appl. No.: 985,268

[22] Filed: Dec. 3, 1992

[30] Foreign Application Priority Data

Dec. 5, 1991 [FR] France ................. 91 15072

[51] Int. Cl.⁵ ............................................. B65D 37/00
[52] U.S. Cl. ..................... 222/214; 222/183; 222/541
[58] Field of Search ............... 222/214, 541, 215, 105, 222/183

[56] References Cited

U.S. PATENT DOCUMENTS

| | | | |
|---|---|---|---|
| 1,775,400 | 9/1930 | Kramer | 222/214 X |
| 2,966,284 | 12/1960 | Lewis | 222/214 X |
| 4,067,499 | 1/1978 | Cohen | |
| 4,177,939 | 12/1979 | Thomas | |
| 4,958,748 | 9/1990 | Otake | 222/183 X |
| 5,137,178 | 8/1992 | Stokes et al. | 222/214 X |
| 5,169,039 | 12/1992 | Kay et al. | 222/214 X |

FOREIGN PATENT DOCUMENTS

| | | |
|---|---|---|
| 0196288 | 10/1986 | European Pat. Off. |
| 9000921 | 5/1991 | Fed. Rep. of Germany |
| 1413975 | 9/1965 | France |
| 2305365 | 10/1976 | France |

*Primary Examiner*—Gregory L. Huson
*Attorney, Agent, or Firm*—Cushman, Darby and Cushman

[57] ABSTRACT

The dosing dispenser, designed particularly for liquid and viscous products, includes a flask (1) containing the product to be dispensed, to the neck (4) of which is fixed a dispenser head (8), the said flask (1) being housed inside a sheath (2) topped with a cover (3) holding the flask in the sheath, through which the dispensing head (8) passes which allows for dispensing of the product. It is possible to compress the neck (4) of the flask (1), and the cover (3) possesses means (21,22) which allow for the neck (4) to be compressed causing the product to be dispensed.

8 Claims, 2 Drawing Sheets

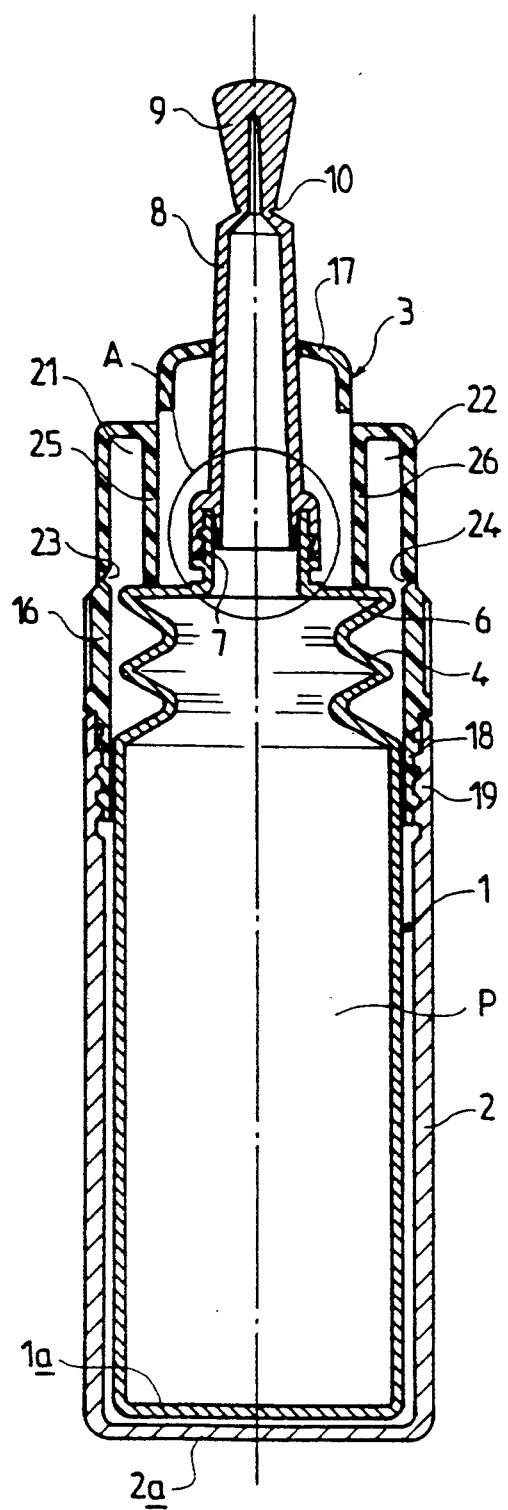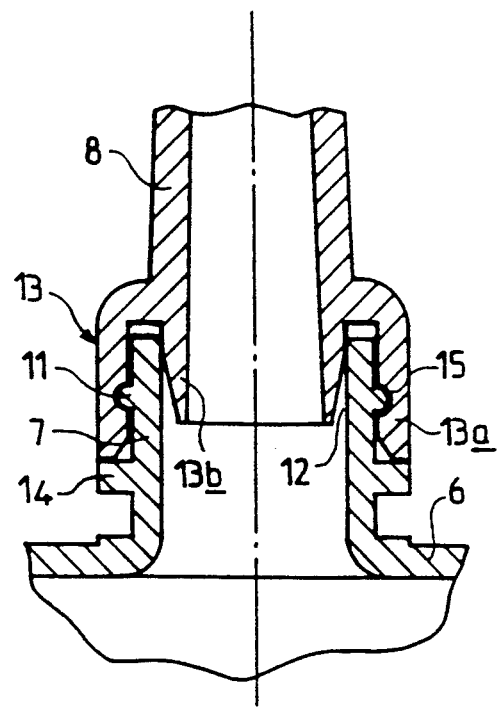

DOSING DISPENSER

FIELD OF THE INVENTION

The invention concerns a dosing dispenser, particularly intended for dispensing liquid and viscous products.

BACKGROUND OF THE INVENTION

Description of the Prior Art

Given the increasing desire of consumers neither to use or to consume products packed in recipients containing pollutant propellant gases, it is becoming increasingly necessary to design packaging which relies on atmospheric pressure for the dispensing and dosing of packed liquid and/or viscous products, as well as simple and safe handling of the packaging when the product is being used.

Even before the creation of pressurised containers, we already knew how to equip recipients intended to be used for dispensing doses of a particular product with heads fitted with a manual pumping and/or spray device. But, apart from such problems as the price of such a fitting, it demanded the inclusion of a plunger tube, extending from the pumping head to the base of the recipient.

French patent 2 353 455 already includes a design for a non-pressurised 'drop by drop' dispenser for eye drops, which includes a head which has to be depressed, fixed to the neck of the bottle. When this particular dispenser is used, drops are formed by depressing the dispensing head; this depression is effected by the users' fingers, via radial elastic compression of two diametrically opposite ribs fitted to the neck of the dispenser. Independent of the fact that the size of the drop and thus the volume of the dose is defined by the dimensions of the different elements of the dispenser, which prevents the doses varying from one to dispenser to another, the head of the dispenser is activated directly, which implies that there is a risk of complete and repetitive depressing of the head which may result in poor premature malfunctioning of this head; such a device does not provide the required level of reliability if emptying the bottle necessitates a large number of strong actions to the head. Moreover, the use of such a 'drop by drop' dispenser is essentially limited to liquids with low viscosity.

German utility model 9 000 921 already proposes a dosing dispenser which includes a bottle in the form of bellows housed in a sheath whose cover has a tube passing through it supported by the bottle, the lid of which is screwed into the sheath in order to compress the 'bellows' and thus dispense the product contained in the bottle; such a dispenser can be difficult to handle, this difficulty increasing as the lid penetrates further down into the sheath.

SUMMARY OF THE INVENTION

The aim of the invention is to propose a simply structured dosing dispenser, which will allow the dosing of a viscous or non-viscous liquid, and reliable enough to ensure safe and simple progressive emptying of the receptacle which contains the product packed in the said dispenser.

The aim of the current invention therefore, is a dosing dispenser, intended particularly for liquid and viscous products, which includes a flask containing the product to be dispensed, there being a dispensing head fixed to the neck of it, the said flask being housed in a sheath with a cover hollowed out in the middle, the said cover holding the flask in the sheath, the dispensing head passing through it in order to allow dispensing of the product, characterised by the fact that the cover bears at least one lateral pusher which will allow the neck to be depressed, thus effecting dispensing of the product.

In the above definition the term 'flask' is used generically and should be considered as being a general term covering any type of receptacle.

Preferably, the neck of the flask should be fitted with a 'bellows' section: part of the flask will be more or less rigid, whereas one end of it will form an elastic depressible section creating the 'bellows'. We are already familiar with the concept of 'bellows' and as we know, within the limits of their dimensions, they will cause the dispensing, each time they are depressed, of a quantity of the desired product, as a function of the degree of the depression effected. We could also foresee bellows on the neck of the flask, formed in such a way that the pressure bearing face, in the resting position, is arranged in such a way that it lies more or less transversal to the longitudinal axis of the flask. In effect, the bellows is a relatively fragile component and in order to avoid premature wearing due to bad handling, becoming offset for example, it is preferable that the pressure bearing face points solely in the direction in which it will be manipulated allowing the bellows to be depressed.

By exploiting the possibilities presented by injection moulding, the cover could be designed in such a way that it has a longitudinal axis on which is placed, the dispensing head, the lateral pusher(s) comprising one single unit with the cover and being able to pivot in relation to the cover around a more or less perpendicular axis of the said cover. It is possible to produce a variation of this, in which the cover would have two lateral pushers placed symmetrically to the dispensing head, it being possible for each lateral pusher to be linked to the cover by a hinged-film.

In a further variation, the flask, the bellows and the dispensing head could be concentric to each other; the cover could be detachable; the dispenser head could have a self-breaking end.

The invention will be better understood after reading the description of the enhanced design, which pertains to the diagram in the appendix, which is given as an example and is not intended to be limiting.

BRIEF DESCRIPTION OF THE DRAWINGS

In this diagram:

FIG. 1 shows a simplified longitudinal section of a dispenser made in accordance with the invention before being used for the first time;

FIG. 2 shows, on a larger scale, detail A of FIG. 1;

DETAILED DESCRIPTION OF THE INVENTION

Figure 3:
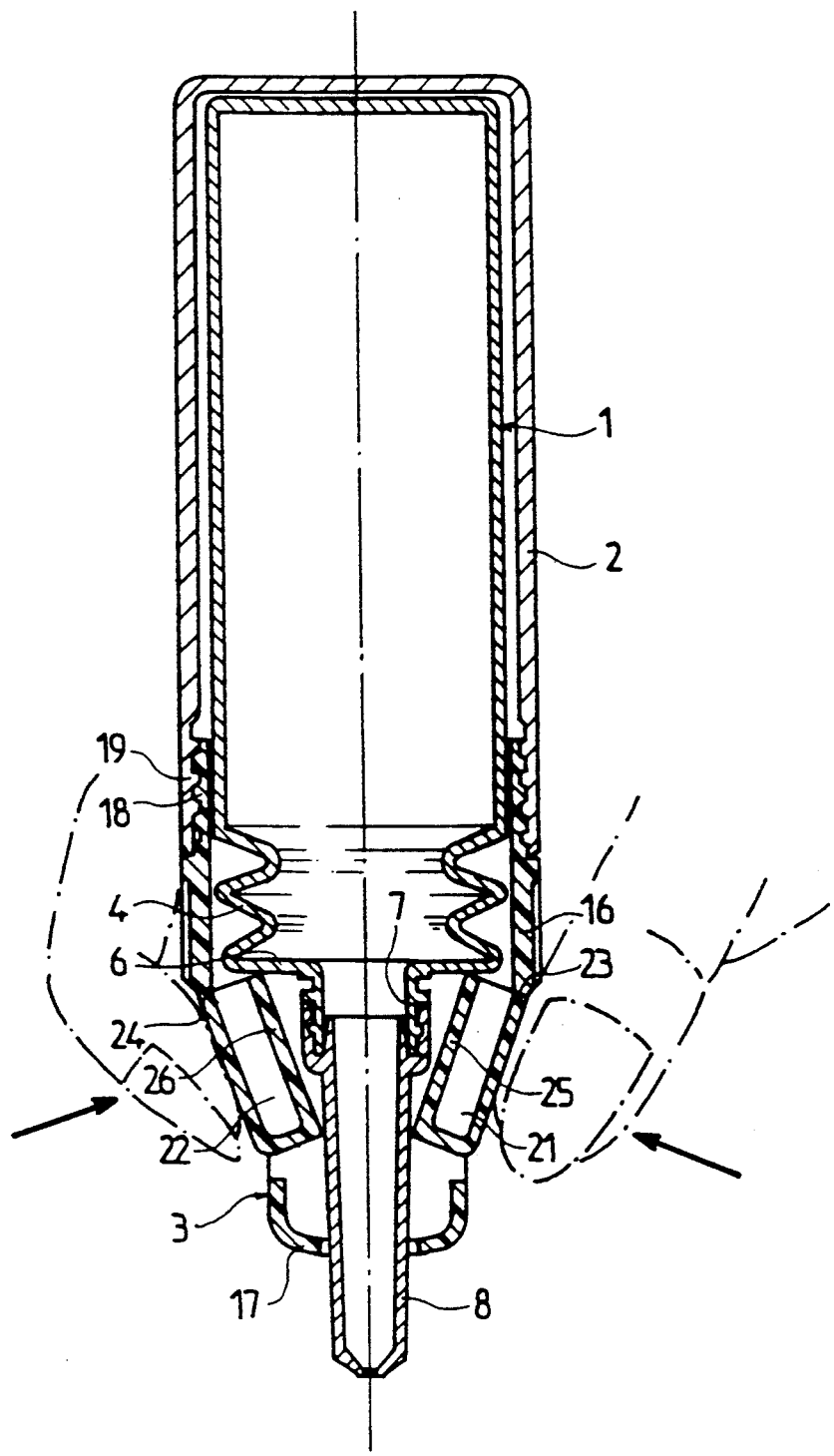
FIG. 3 shows the dispenser made in accordance with the invention whilst dispensing a dose.

Reference to the diagram will show that the dosing dispenser made in accordance with the invention includes a flask 1, which is housed in a carton 2 and held in this by a cover 3, and screwed onto the sheath. The flask 1 is more or less in the form of a rotation cylinder, closed at one end by a base 1a and activated at the open end which is opposite to the base 1a, in such a way that it forms a neck; the neck area, includes, on one hand, 'bellows' 4 which may be compressed in line with the axis of the flask 1 and on the other hand, a flange 7.

The end of the 'bellows' 4, which is the furthest away from the base 1a of the flask 1, is formed of a plate which slopes in the resting position, on a transversal plane in relation to the longitudinal axis of the flask 1; this plate is composed of a bearing face 6 which allows the bellows to be compressed when force is applied to the bearing face 6 in the direction of the base 1a of the flask 1. Once the said force has been suppressed, the return of the face 6 to its initial resting position is effected by the elastic return motion of the material of which the bellows 4 are made.

The flange 7 is supported by the central area of the bearing face: it is cylindrical, with a straight, circular central section and links the exterior and interior of the sides of the flask 1. This flange 7 is composed on the outside, of a device to prevent clicking 11, which allows for the dispenser head 8 to be fixed on. The head 8 is a slightly tapered truncated cone, the widest end of which forms a shoulder 13, the other end being closed by a breakable tip 9.

The tip 9 serves to seal the flask until the first application of the packed product. For convenience of use, the tip 9 is self breaking and includes a pre-weakened breaking zone 10.

The shoulder 13 of the head 8 is composed of two more or less cylindrical concentric skirts 13a, 13b; the sides of the flange 7 are held between the two skirts. The inside of the external skirt 13a bears a ratchet groove 15 intended to receive the flange 11 in order to ensure the holding in place of the head 8 on the flange 7 by a ratchet. The free end of the internal skirt 13b is chamfered to allow for it to pass easily into the flange 7; this is effected by being slightly clamped into place to achieve a seal. The exterior of the flange 7 bears a planar flange 14, which forms an end stop when the head 8 is put into place on the flange 7. The free edge of the inside of the skirt 13a is chamfered, in order to facilitate the introduction of the seal 11 in the ring-shaped area 12, between the two skirts 13a, 13b.

The sheath 2 is more or less in the form of a revolution cylinder, one of its end being closed by a base 2a and the other with a cover 3. The cover 3 includes a collar 17, the center of which is removed to allow the passage of the dispenser head 8 and a revolution cylindrical lateral side 16, interdependent with the collar 17. The free end of the lateral side 16 is equipped with an external thread 18. This external thread forms, together with an internal thread 19 housed in the side of the sheath 2 of the side of opposite to the base 2a, a fixing device, which allows the cover 3 to be fixed in a removable way onto the sheath 2 by being screwed on. It is evident that this fixing device could also be arranged in such a way that another method of fixing the cover 3 onto the sheath 2 could be used, for example, a latching device. The cover 3 could also be permanently fixed onto the sheath 2, say, by gluing.

The lateral wall 16 of the cover 3 bears, in the section of the cover 3 adjacent to the collar 17, two radial 'pushers' 21 and 22, positioned symmetrically in relation to the dispenser head 8. Whilst being interdependent with the lateral wall 16 of the cover 3, it is possible to recline the pushers 21 and 22 in relation to the longitudinal axis of the cover 3 and thus, taking account of the concentric assembly of the flask 1, of the bellows 4 and of the head 8, reclinable in relation to the longitudinal axis of the flask 1. The reclining of the pushers is effected around the elastic zones formed by the cylindrical wall 16 of the cover 3 by the filmed hinges 23, 24, indicated on the diagram in FIG. 1 by notches.

The form of the pushers 21 and 22 is shown on FIG. 1 by two arms 25 and 26, set parallel, respectively, to the lateral wall 16. The length of these arms as well as the position of the hinged areas 23, 24, should be selected in such a way that after insertion of a flask 1 into the sheath 2, the hinged areas 23, 24, in relation to the longitudinal axis of the flask 1, lie in the same transversal plane as the bearing face 6 of the bellows 4, and that the arms 25, 26 come into contact with the bearing face 6.

Application of the product contained in the flask 1 is effected when the dispenser head 8 is in the low position; the lateral pushers 21 and 22 are pushed, thus compressing the bellows 4, which is a function of the maximum degree to which it is possible to recline these pushers; the degree to which they are reclined therefore has a direct influence on the size of the dose dispensed. The size of the dose may therefore be easily controlled mechanically, for example by regulating the end stop of the pushers. Independent of the fact that activating the dosing dispenser forming the object of the invention produces a fine and simple dosing action thanks to the application of the 'levers principle', it also allows simultaneously, for sound manipulation of the whole unit; the pressure on the pushers being exerted only by the thumb and the index finger of one hand, the greater part of this hand, including the three remaining fingers, remain free to hold the sheath.

The design of the dosing dispenser in accordance with the invention brings about considerable simplification to the manufacture of a device of this type and considerably reduces the associated cost of manufacture. In particular, it allows for a simple manufacturing process of the cover 3, by injected moulding for example, and avoids, thanks to the inherent capacity of the plastic material used to make the bellows 4 to return to its original form, having to equip the cover 3 with a spring type device. The result is a cover 3, which may be manufactured in one single piece. In the same way, thanks to injection moulding, obtain a flask 1 with bellows 4 from one single manufacturing process and in one single unit.

Moreover, the dosing dispenser made in accordance with the invention avoids the inclusion of a plunger tube and, furthermore, allows for the packing of liquid products, irrespective of their viscosity. The consumer therefore is able to use more or less all the product contained in the flask and does not lose any of the product, which is inevitable at the moment. Finally, it is possible to reload the sheath 2 and so it may be used in conjunction with a disposable flask 1, which may for example have been intended for one single application: the invention allows therefore for the major part 2, 3 of the dispenser to be retained, changing only the refill 1, 4, 8 of the product, which affords considerable economy in relation to prior art.

The dosing dispenser made in accordance with the invention was designed mainly for more or less viscous liquid products; it would nevertheless be possible to adapt it to powdered products, without altering the principle and advantages of the present invention.

I claim:

1. A dosing dispenser comprising a first container for a product to be dispensed, said container having a neck at one end thereof, a dispensing head connected to said neck, a second container, said first container being disposed in said second container, said second container having one end and a cover attached to said one end, said cover having a longitudinal axis and an opening surrounding said axis, said cover engaging said dispensing head to hold said first container in place in said second container, said dispensing head extending through said opening in said cover, said first container including an end wall surrounding said neck and a compressible wall portion extending from said end wall, said end wall extending substantially perpendicularly to said longitudinal axis of said cover, said cover including pushing members each mounted for pivoting movement about respective pivot axes each extending substantially perpendicular to said longitudinal axis of said cover so that said pushing members will engage said end wall and compress said wall portion to effect dispensing of the product.

2. The invention as claimed in claim 1 wherein said compressible wall portion is bellows shaped.

3. The invention as claimed in claim 1 wherein said pushing members are formed integrally with said cover.

4. The invention as claimed in claim 3 wherein said pushing members are each connected by a film hinge to said cover.

5. The invention as claimed in claim 1 wherein said pushing members are disposed symmetrically to one another on said cover.

6. The invention as claimed in claim 1 wherein said first and second containers and said dispensing head are disposed concentrically with respect to each other.

7. The invention as claimed in claim 1 wherein said cover is removably attached to said second container.

8. The invention as claimed in claim 1 wherein said dispensing head includes a breakable end portion.

* * * * *